(12) United States Patent
Ryu et al.

(10) Patent No.: US 9,054,392 B2
(45) Date of Patent: Jun. 9, 2015

(54) ELECTROLYTE SOLUTION AND MAGNESIUM BATTERY INCLUDING THE SAME

(75) Inventors: Young-gyoon Ryu, Suwon-si (KR); Sang-ho Park, Yongin-si (KR); Myung-dong Cho, Hwaseong-si (KR); Young-min Choi, Suwon-si (KR); Seok-soo Lee, Yongin-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 1034 days.

(21) Appl. No.: 13/157,680

(22) Filed: Jun. 10, 2011

(65) Prior Publication Data
US 2012/0171577 A1    Jul. 5, 2012

(30) Foreign Application Priority Data
Dec. 30, 2010  (KR) .......................... 10-2010-0139355

(51) Int. Cl.
*H01M 10/056* (2010.01)
*H01M 10/054* (2010.01)
(Continued)

(52) U.S. Cl.
CPC .... *H01M 10/054* (2013.01); *H01M 2300/0025* (2013.01); *H01M 4/483* (2013.01);
(Continued)

(58) Field of Classification Search
None
See application file for complete search history.

(56) References Cited

U.S. PATENT DOCUMENTS 5,789,585 A     8/1998  Lee et al.
6,120,941 A *   9/2000  Lee et al. ..................... 429/303
(Continued)

FOREIGN PATENT DOCUMENTS

CN      100466349       3/2009
JP      2004-259650     9/2004
(Continued)

OTHER PUBLICATIONS

Mani, Ganesan et al. "Azatripyrrolic and Azaterapyrrolic Macrocycles from the Mannich Reaction of Pyrrole: Receptors for Anions." *Organic Letters*. 2010. vol. 12, No. 14. pp. 3212-3215.

*Primary Examiner* — Barbara Gilliam
*Assistant Examiner* — Adam A Arciero
(74) *Attorney, Agent, or Firm* — Cantor Colburn LLP

(57) ABSTRACT

An electrolytic solution including: a magnesium salt; a non-aqueous organic solvent; and an anion receptor, wherein the anion receptor comprises at least one compound selected from the group consisting of compounds represented by Formulae 1 and 2 below:

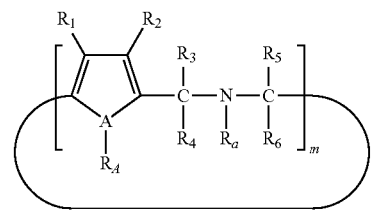

<Formula 1>

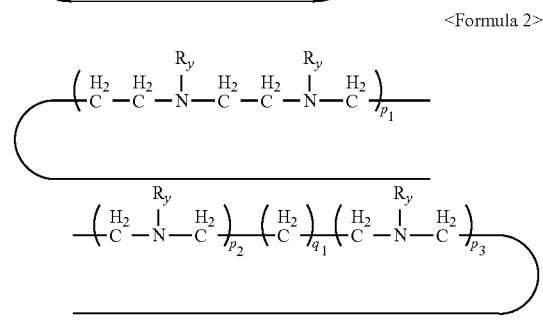

<Formula 2> where A, m, $p_1$, $p_2$, $p_3$, $q_1$, $R_A$, $R_a$, $R_1$ through $R_6$, and $R_y$ are the same as described in the detailed description section.

17 Claims, 2 Drawing Sheets

(51) Int. Cl.
*H01M 10/0567* (2010.01)
*H01M 4/48* (2010.01)
*H01M 4/58* (2010.01)
*H01M 10/0568* (2010.01)
*H01M 10/0569* (2010.01)
*H01M 4/46* (2006.01)

(52) U.S. Cl.
CPC .............. *H01M 4/58* (2013.01); *H01M 4/5815* (2013.01); *H01M 10/0567* (2013.01); *H01M 10/0568* (2013.01); *H01M 10/0569* (2013.01); *H01M 4/466* (2013.01)

(56) References Cited

U.S. PATENT DOCUMENTS

2003/0054258 A1\* 3/2003 Ito et al. ........................ 429/324
2004/0137324 A1\* 7/2004 Itaya et al. .................... 429/188
2012/0100424 A1 4/2012 Lee et al.

FOREIGN PATENT DOCUMENTS

KR 10-2010-0039295 4/2010
KR 1020120040969 A 4/2012

\* cited by examiner

ELECTROLYTE SOLUTION AND MAGNESIUM BATTERY INCLUDING THE SAME

CROSS-REFERENCE TO RELATED APPLICATIONS

This application claims the benefit of Korean Patent Application No. 10-2010-0139355, filed on Dec. 30, 2010, in the Korean Intellectual Property Office, the disclosure of which is incorporated herein in its entirety by reference.

BACKGROUND OF THE INVENTION

1. Field

The present disclosure relates to electrolytic solutions containing an anion receptor and electrochemical devices including the electrolytic solution.

2. Description of the Related Art

Recently, materials for use in power-storage batteries are receiving great attention.

Compared to conventional lithium batteries, lead storage batteries, nickel-cadmium batteries, nickel-hydrogen batteries, and nickel-zinc batteries, magnesium batteries are environmentally friendly and relatively inexpensive, and have good energy storage characteristics. Due to these features, research on magnesium batteries is being actively pursued.

A conventional magnesium battery includes a positive electrode including a bulk-form metal-sulfide based active material, such as $Mo_6S_8$, a negative electrode including a magnesium-based active material, such as magnesium or an alloy thereof, and an electrolytic solution prepared by dissolving a magnesium salt in an organic solvent.

The electrolytic solution contacts materials that comprise the positive electrode and the negative electrode and thus, needs to maintain its chemical reactivity. However, in most cases, an electrolytic solution forms a film on a negative electrode, thereby inhibiting or stopping electrochemical reactions.

An electrolytic solution including a Grignard-based magnesium salt is generally known as an electrolytic solution that does not form a film on a negative electrode.

However, the electrolytic solution including a Grignard-based magnesium salt includes a carbanion and due to the presence of the carbanion, the electrolytic solution reacts with water molecules, oxygen, or carbon dioxide in air, thereby lessening its chemical stability.

In response, research is being conducted to find as an alternative to the Grignard-based magnesium salt, an electrolytic solution that includes a conventional magnesium salt, such as $Mg(ClO_4)_2$ or $Mg(N(SO_2CF_3)_2)_2$, and a non-aqueous organic solvent, such as ether.

However, it is difficult for a magnesium salt to dissociate in a non-aqueous organic solvent, such as ether.

Accordingly, there is a need to improve the degree of dissociation of a magnesium salt in a non-aqueous organic solvent while maintaining its chemical stability.

SUMMARY OF THE INVENTION

Provided are macrocyclic anion receptors and electrolytic solutions containing same having chemical stability and a high dissociation degree of a magnesium salt.

Also provided are electrochemical devices; in particular, magnesium batteries having chemical stability and reversibility.

Additional aspects will be set forth in part in the description which follows and, in part, will be apparent from the description, or may be learned by practice of the presented embodiments by those skilled in the art.

According to an aspect of the present invention, an electrolytic solution includes: a magnesium salt; a non-aqueous organic solvent; and a macrocyclic anion receptor selected from the group consisting of compounds represented by Formulae 1 and 2 below:

<Formula 1>

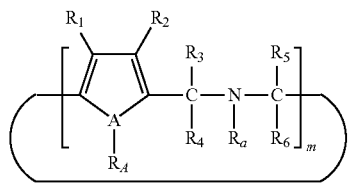

<Formula 2>

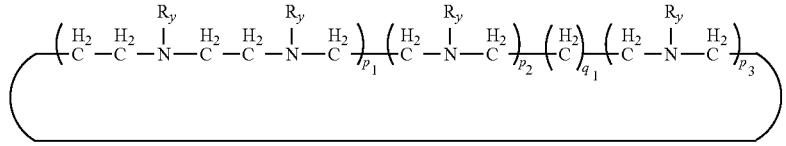

Wherein:

A is an oxygen (O) atom, a nitrogen (N) atom, or a sulfur (S) atom;

m is an integer of 3 to 8, inclusive;

$p_1$, $p_2$, and $p_3$ are each independently an integer of 0 to 10, inclusive and $p_1+p_2+p_3>0$;

$q_1$ is an integer of 0 to 5, inclusive;

$R_A$ and $R_a$ are each independently a hydrogen atom, a halogen atom, an amino group, —N(R)(R') where R and R' are each independently a hydrogen atom, a C1-C10 alkyl group, or a C6-C20 aryl group, a carboxy group, a carbamate group, a substituted or unsubstituted C1-C20 alkyl group, or a substituted or unsubstituted C6-C20 aryl group;

$R_1$ through $R_6$ are each independently a hydrogen atom, a halogen atom, a hydroxy group, —N(R)(R') where R and R' are each independently a hydrogen atom, a C1-C10 alkyl group, or a C6-C20 aryl group, an ester group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group; and $R_y$ is $CF_3$, a carbonyl group, or an ester group . . . .

According to another aspect of the present invention, a magnesium battery is provided which includes: a positive electrode including a positive active material that intercalates or deintercalates a magnesium ion, a negative electrode including a negative active material that intercalates or deintercalates a magnesium ion, and an electrolytic solution which is interposed between the positive electrode and the negative electrode and with which the positive electrode and the negative electrode are impregnated, wherein the electrolytic solution is the electrolytic solution described above.

BRIEF DESCRIPTION OF THE DRAWINGS

These and/or other aspects will become apparent and more readily appreciated from the following description of the preferred embodiments, taken in conjunction with the accompanying drawings wherein.

DETAILED DESCRIPTION OF THE INVENTION

Figure 1:
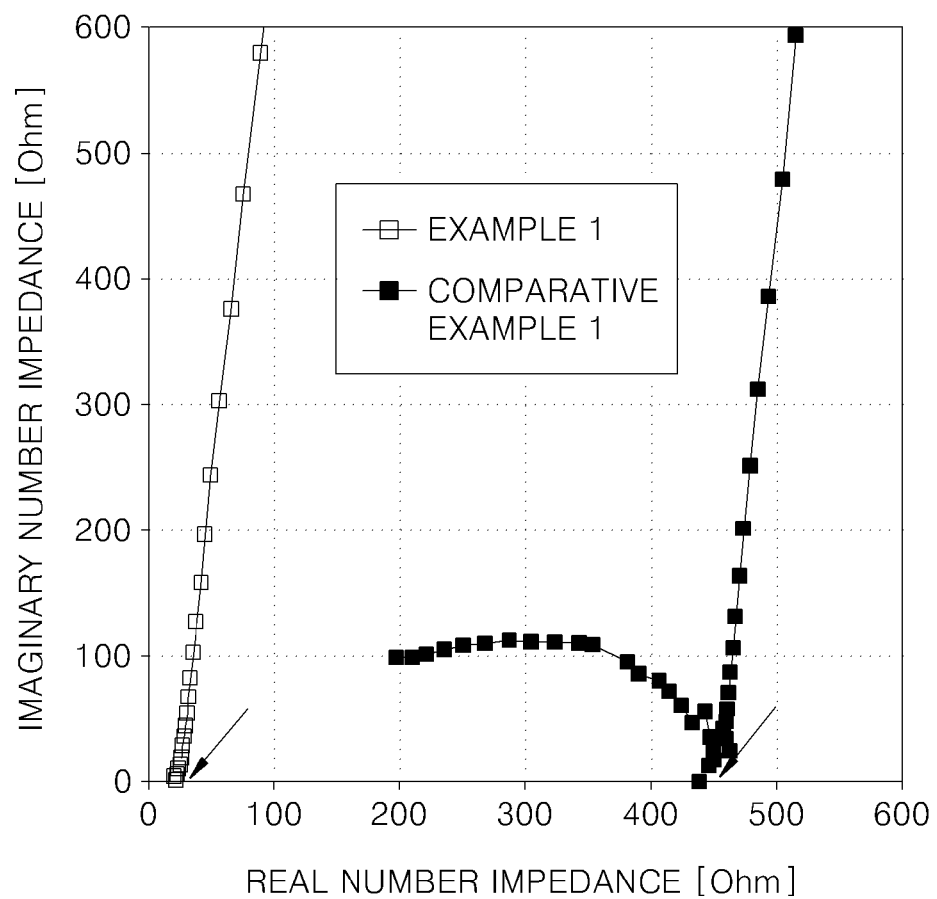
FIG. 1 shows impedance measurement characteristics of electrolytic solutions manufactured according to Example 1 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, an electrolytic solution according to an embodiment of the present invention and a magnesium battery including the same will be described in detail. The electrolytic solution and the magnesium battery are presented for illustrative purposes only and the present invention is defined only by the claims.

An electrolytic solution according to an embodiment of the present invention includes a magnesium salt, a non-aqueous organic solvent, and a macrocyclic anion receptor selected from the group consisting of compounds represented by Formulae 1 and 2 below:

$q_1$ is an integer of 0 to 5, inclusive;

$R_A$ and $R_a$ are each independently a hydrogen atom, a halogen atom, an amino group, —N(R)(R') where R and R' are each independently a hydrogen atom, a C1-C10 alkyl group, or a C6-C20 aryl group, a carboxy group, a carbamate group, a substituted or unsubstituted C1-C20 alkyl group, or a substituted or unsubstituted C6-C20 aryl group;

$R_1$ through $R_6$ are each independently a hydrogen atom, a halogen atom, a hydroxy group, —N(R)(R') where R and R' are each independently a hydrogen atom, a C1-C10 alkyl group, or a C6-C20 aryl group, an ester group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group; and $R_y$ is $CF_3$, a carbonyl group, or an ester group.

Conventional magnesium batteries include a positive electrode, a negative electrode, and an ion conductive electrolytic solution, typically, an ether-based electrolytic solution including a Grignard-based magnesium salt (RMgX wherein R is an alkyl group or an aryl group, and X is Cl or Br) that does not form a film on the negative electrode. An example of an electrochemical reaction of such a magnesium battery is as follows:

Positive electrode:

Negative electrode:

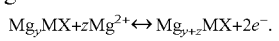

That is, during discharging, electrons flow from the negative electrode to an external circuit and a generated magnesium ion passes through the electrolytic solution (oxidation reaction), and during charging, the magnesium ion moves to the negative electrode and combines with an electron, thereby forming a metal (reduction reaction).

However, due to the presence of a carbanion, such as RMgX or $R_2Mg$, the electrolytic solution including a Grignard-based magnesium salt may react with water molecules, oxygen, or carbon dioxide in air, thereby lessening its chemical stability.

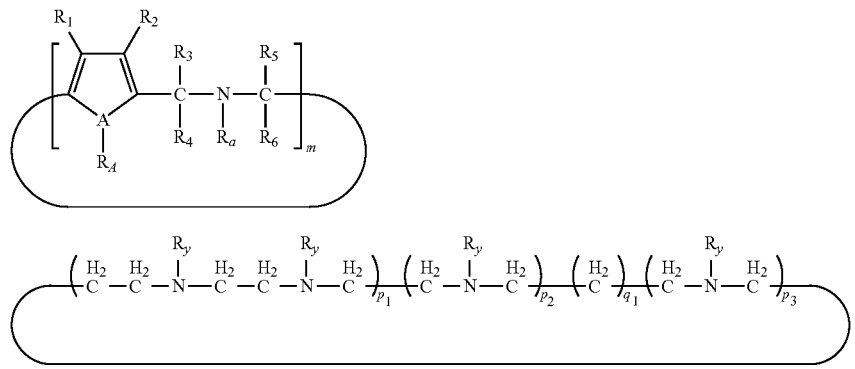

wherein

A is an oxygen (O) atom, a nitrogen (N) atom, or a sulfur (S) atom;

m is an integer of 3 to 8, inclusive;

$p_1$, $p_2$, and $p_3$ are each independently an integer of 0 to 10, inclusive and $p_1+p_2+p_3>0$;

In addition, an electrolytic solution including a conventional magnesium salt, such as $Mg(ClO_4)_2$ or $Mg(N(SO_2CF_3)_2)_2$, and a non-aqueous organic solvent, such as ether, may also be used instead of the Grignard-based magnesium salt. In this case, however, it is difficult for a conventional magnesium salt to dissociate in a non-aqueous organic solvent, such as ether.

However, if an additive, such as a macrocyclic anion receptor, that is bondable to an anion of a magnesium salt is added to the electrolytic solution, the electrolytic solution becomes chemically stable in air, and the degree of dissociation of the magnesium salt may be increased since the additive forms a complex together with the anion of the magnesium salt.

According to an embodiment of the present invention, the anion receptor may be a compound represented by Formula 1.

In Formula 1, A may be an oxygen (O) atom, a nitrogen (N) atom, or a sulfur (S) atom, and for example, a nitrogen (N) atom.

If in Formula 1, A is a nitrogen (N) atom, the compound may be, for example, a calix(n) pyrrol, more particularly, azacalix(n) pyrrol.

The term 'calix(n) pyrrol' used herein refers to a macrocyclic compound having n pyrrol groups connected to α-positions by a $sp^3$ hybrid meso-carbon atom that does not bind to a protium atom, a deuterium atom, or a tritium atom. The calix(n) pyrrol is distinctive from a porphyrin that has one or more $sp^3$ hybrid meso-carbon atoms bound to a protium atom, a deuterium atom, or a tritium atom.

The calix(n) pyrrol may bind to an anion or neutral molecular species in a solution or solid state in such a way that the anion and neutral molecular species is effectively and selectively separated from other anion or neutral molecular species.

In the calix(n) pyrrol represented by Formula 1, n may be an integer of 3 to 8, inclusive, inclusive, for example, 3 to 7. In Formula 1 above, $m_1$ and $m_2$ may each be an integer of 3 to 8, inclusive, for example, 3 to 7.

If in Formula 1, n is an integer of 3 to 8, inclusive, the calix(n) pyrrol may non-covalently bond to the anion of the magnesium salt in the non-aqueous organic solvent, such as an ether-based solvent so as to form a complex.

The expression 'non-covalently bond to the anion of the magnesium salt so as to form a complex' means that a bound molecule is maintained as a nucleus of a macrocycle by non-covalent bonding to one or more pyrrolic N—H groups to form a supermolecular ensemble.

The 'non-covalent bonding' may be achieved by intermolecular interaction, for example, hydrogen bonding, dipole-dipole interaction, dipole-induced dipole interaction, ion-dipole interaction, ion-pairing, Van der Waals interaction, London dispersion, π-π stacking interaction, edge-to-face π interaction, caion-π interaction, a charge transfer interaction or entropy effect, a hydrophobic effect, or a solvophobic effect. For example, the anion receptor, that is, a hydrogen atom of pyrrolic N—H is bonded to an anion of a magnesium salt by hydrogen bonding.

Since a hydrogen atom of pyrrolic N—H is bonded to the anion of the magnesium salt by hydrogen bonding, stable binding between the anion and the magnesium ion may be prevented, thereby improving the degree of dissociation of the magnesium salt in an electrolytic solution.

In the calix(n) pyrrol represented by Formula 1 where n is an integer of 3 to 8, inclusive, even when the hydrogen atom of pyrrolic N—H and the anion of the magnesium salt are bulky, the bonding by hydrogen bonding is possible and the viscosity of the electrolytic solution may be controlled. Accordingly, ion conductivity of the electrolytic solution is improved.

Substituuentsin Formula 1 may be defined as follows.

The term "ester group" used in connection with Formula 1 refers to a group represented by —COOR; and the term "carbonate group" refers to a group represented by —OCO(OR). In this case, R may each be a hydrogen atom, a C1-C10 alkyl group, or a C6-C20 aryl group.

The 'substituted' alkyl group, alkoxy group, alkenyl group, akynyl group, alkylene oxide group, cycloalkyl group, aryl group, aryloxy group, or heteroaryl group used in connection with Formula 1 refers to an alkyl group, alkoxy group, alkenyl group, akynyl group, alkylene oxide group, cycloalkyl group, aryl group, aryloxy group, or heteroaryl group substituted with a halogen atom; an alkyl group, alkoxy group, alkenyl group, akynyl group, alkylene oxide group, cycloalkyl group, aryl group, aryloxy group, or heteroaryl group substituted with a C1-C20 alkyl group (for example: $CCF_3$, $CHCF_2$, $CH_2F$, $CCl_3$ etc) substituted with a halogen atom; or an alkyl group, alkoxy group, alkenyl group, akynyl group, alkylene oxide group, cycloalkyl group, aryl group, aryloxy group, or heteroaryl group substituted with a hydroxy group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 hetero arylalkyl group.

Examples of the C1-C20 alkyl group used in connection with Formula 1 are methyl, ethyl, propyl, isobutyl, sec-butyl, ter-butyl, neo-butyl, iso-amyl, and hexyl, and one or more hydrogen atoms of the alkyl group may be substituted with the substituents described above where the term 'substituent' is defined.

Examples of the C1-C20 alkoxy group used in connection with Formula 1 are methoxy, ethoxy, and propoxy, and one or more hydrogen atoms of the alkoxy group may be substituted with the substituents described above where the term 'substituuent' is defined.

Examples of the C2-C20 alkenyl group used in connection with Formula 1 are vinylene and allylene, and one or more hydrogen atoms of the alkenyl group may be substituted with the substituents described above.

Examples of the C2-C20 alkynyl group used in connection with Formula 1 include acetylene, and one or more hydrogen atoms of the alkynyl group may be substituted with the substituents described above.

Examples of the C2-C20 alkylene oxide group used in connection with Formula 1 are ethylene oxide, propylene oxide, and butylene oxide, and one or more hydrogen atoms of the alkylene oxide group may be substituted with the substituents described above.

Examples of the C3-C30 cyclo alkyl group used in connection with Formula 1 are cyclopropyl, cyclobutyl, cyclopentyl, and cyclohexyl, and one or more hydrogen atoms of the cyclo alkyl group may be substituted with the substituents described above.

The C6-C30 aryl group is used alone or in combination, and refers to an aromatic system having one or more rings. Examples of the C6-C30 aryl group are phenyl, naphthyl, or tetrahydronaphthyl. Also, one or more hydrogen atoms of the aryl group may be substituted with the substituents described above.

Examples of the C6-C30 aryloxy group include phenoxy, and one or more hydrogen atoms of the aryloxy group may be substituted with the substituents described above.

The C6-C30 heteroaryl group refers to an organic compound that contains one or more hetero atoms selected from N, O, P, and S, and the remaining ring atoms are carbon atoms. Examples of the C6-C30 heteroaryl group include pyridyl. Also, one or more hydrogen atoms of the heteroaryl group may be substituted with the substituents described above.

In the calix(n) pyrrol, affinity of the macrocycle to a particular species is controllable by effectively selecting an electron-donating peripheral substituent or an electron-withdrawing peripheral substituent. Accordingly, the substituents used with reference to Formula 1 are not limited, and may be any suitable substituents that are commonly used in the art.

The anion receptor may be, for example, a compound represented by Formula 3 below:

<Formula 3>

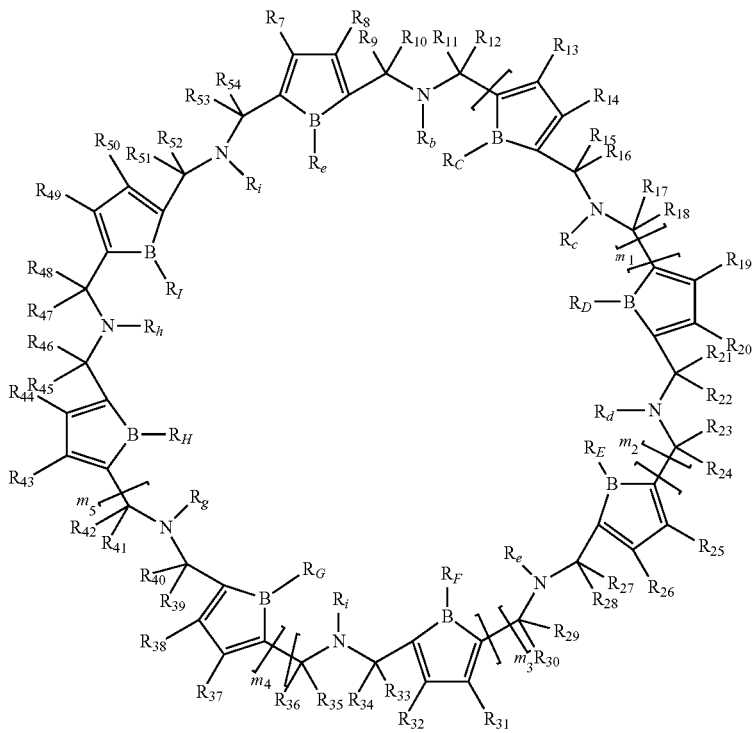

wherein:

B is an oxygen (O) atom, a nitrogen (N) atom, or a sulfur (S) atom;

$m_1$ through $m_5$ are each 0 or 1;

$R_B$, $R_C$, $R_D$, $R_E$, $R_F$, $R_G$, $R_H$, $R_I$, $R_b$, $R_c$, $R_d$, $R_e$, $R_f$, $R_g$, $R_h$, and $R_i$ are each independently a hydrogen atom, a halogen atom, an amino group, —N(R)(R') where R and R' are each independently a hydrogen atom, a C1-C10 alkyl group, or a C6-C20 aryl group, a carboxy group, a carbamate group, a substituted or unsubstituted C1-C20 alkyl group, or a substituted or unsubstituted C6-C20 aryl group; and $R_7$ through $R_{54}$ are each independently a hydrogen atom, a hydroxy group, —N(R)(R') where R and R' are each independently a hydrogen atom, a C1-C10 alkyl group, or a C6-C20 aryl group, an ester group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

The anion receptor may be, for example, a compound represented by Formula 4 below:

<Formula 4>

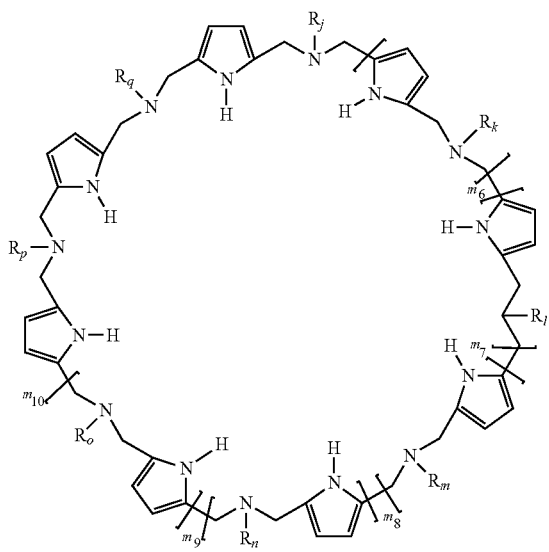

wherein:

$m_6$ through $m_{10}$ are each 0 or 1; and $R_j$, $R_k$, $R_l$, $R_m$, $R_n$, $R_o$, $R_p$ and $R_q$ are each independently a hydrogen atom, a hydroxy group, —N(R)(R') where R and R' are each independently a hydrogen atom, a C1-C10 alkyl group, or a C6-C20 aryl group, an ester group, an amide group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

The anion receptor may be, for example, at least one compound selected from the group consisting of compounds represented by Formulae 5 and 6:

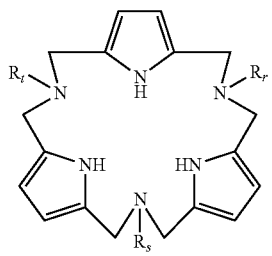

<Formula 5>

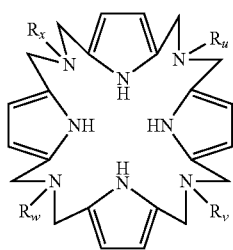

<Formula 6> where $R_r$, $R_s$, $R_t$, $R_u$, $R_v$, $R_w$, and $R_x$ are each independently a hydrogen atom, a hydroxy group, —N(R)(R') where R and R' are each independently a hydrogen atom, a C1-C10 alkyl group, or a C6-C20 aryl group, an ester group, an amide group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

The definition of a substituent used in connection with Formulae 3 through 6 may be the same as the substitution (or substituent) used in connection with Formula 1.

The anion receptor may be, for example, at least one compound selected from the group consisting of compounds represented by Formulae 7 through 9 below:

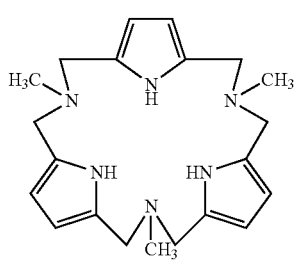

<Formula 7>

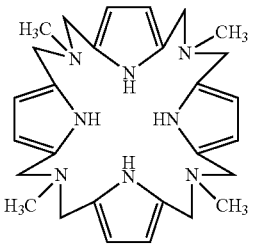

<Formula 8>

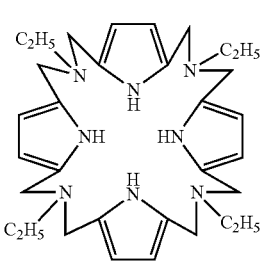

<Formula 9>

An anion receptor selected from the group consisting of compounds represented by Formulae 3 through 9, for example, an anion receptor selected from the group consisting of compounds represented by Formulae 4 through 9, for example, an anion receptor selected from the group consisting of compounds represented by Formulae 5 and 6, for example, an anion receptor selected from the group consisting of compounds represented by Formulae 7 through 9 may relatively easily form a complex by non-covalently bonding to an anion of a magnesium salt.

A method of preparing the anion receptor may comprise, for example, forming an imine intermediate; and reacting the imine intermediate with an electron-rich hetero ring compound.

The forming of the imine intermediate may further include forming an imine cation intermediate from at least one compound selected from the group consisting of aldehyde and amine as a starting material. The aldehyde may be formaldehyde or acetaldehyde. The amine may include a C1-C20 primary amine or a C1-C20 secondary amine.

The electron-rich hetero ring compound may be at least one selected from the group consisting of furan, pyrrol, or thiophene.

For example, in order to form the anion receptor, formaldehyde may be reacted with a primary amine in the presence of an acid catalyst to form an imine cation intermediate, and the electron-rich pyrrol gives an electron to the imine cation intermediate to produce a compound —CH$_2$N(R)CH$_2$— where R is an unsubstituted C1-C20 alkyl group connected to a pyrrol group.

Also, the anion receptor may be a compound represented by Formula 2:

<Formula 2>

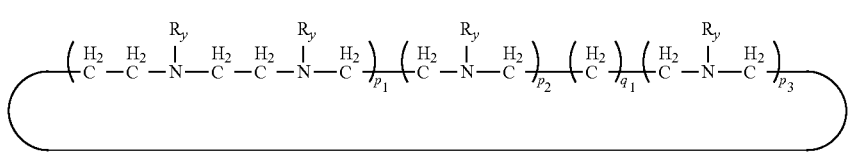

where $p_1$, $p_2$, and $p_3$ are each independently an integer of 0 to 10, inclusive, and $p_1+p_2+p_3>0$;

$q_1$ is an integer of 0 to 5, inclusive; and $R_y$ is $CF_3$, a carbonyl group, or an ester group.

The compound of Formula 2 is an aza-ether based compound.

For example, the anion receptor may be an aza-ether based compound represented by Formula 10 or 11 below:

<Formula 10>

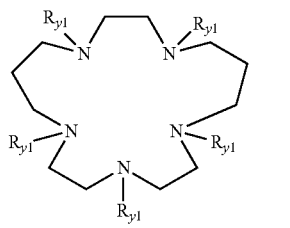

<Formula 11>

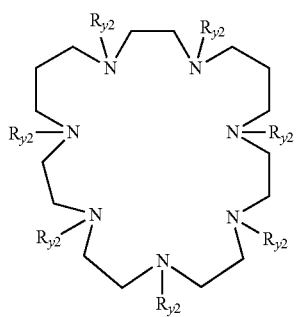

where $R_{y1}$, and $R_{y2}$ are the same as defined in connection with Formula 2.

N atoms contained in the compounds above relatively lack an electron due to an electron-withdrawing substituent, such as $R_y$, binding to the N atoms and thus become relatively positive. Thus, N atoms are bound to an anion of a magnesium salt by non-covalent bond, for example, a coordination bond to form a complex, thereby increasing the degree of dissociation of a magnesium salt in the electrolytic solution.

In Formula 2, $p_1$, $p_2$, and $p_3$ may be each independently an integer of 0 to 10, inclusive, for example, 1 to 3. Also, $q_1$ is an integer of 0 to 5, inclusive, for example, 1 to 5.

If $p_1$, $p_2$, $p_3$ and $q_1$ are within the integer ranges described above, even when the anion of the magnesium salt is bulky, the compound may be effectively bound to the anion of the magnesium salt by a non-covalent bond, for example, a coordination bond, to form a complex.

In Formula 2, $R_y$ may be —$CF_3$, a carbonyl group, or an ester group, and for example, —$CF_3$. The term "carbonyl group" refers to —COR where R is a hydrogen atom, a C1-C10 alkyl group, or a C6-C20 aryl group. Also, the term 'ester group' is the same as defined in connection with Formula 1.

If $R_y$ is a carbonyl group or an ester group, the compound has a strong electro-withdrawing ability. Also, the structure of the compound is similar to carbonates and ethes and thus the compound easily dissolves in a solvent, thereby easily forming a complex.

If $R_y$ is $CF_3$, the electron-withdrawing substituent is small and thus an electron-withdrawing ability may be increased. Thus, the compound may be easily bound to the anion of the magnesium salt by a non-covalent bond, for example, a coordination bond, to form a complex.

For example, the anion receptor may be a compound represented by Formula 12 below:

<Formula 12>

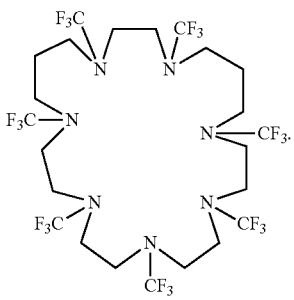

In the electrolytic solution, a concentration of the anion receptor may be about 0.01 to about 2.0 M, for example, about 0.01 to about 1.5 M, for example, about 0.01 to about 1.0 M.

If the concentration of the anion receptor is within the ranges described above, the anion receptor that is at least one compound selected from the group consisting of compounds represented by Formulae 1 and 2 will easily dissolve in the non-aqueous organic solvent, and the degree of dissociation of a magnesium salt is effectively increased.

Nonlimiting examples of the magnesium salt are a chloride ($MgCl_2$), a bromide ($MgBr_2$), a iodide ($MgI_2$), perchlorate salt ($Mg(ClO_4)_2$), tetrafluoroborate($Mg(BF_4)_2$), tetraphenylborate($Mg(B(C6H_5)_4)_2$), butyltriphenylborate($Mg(BC_4H_9(C_6H_5)_3)_2$), dibutyldiphenylborate($Mg(B(C_4H_9)_2(C_6H_5)_2)_2$), tributylphenylborate($Mg(B(C_4H_9)_3(C_6H_5))_2$), tetrabutylborate($Mg(B(C_4H_9)_4)_2$), hexafluorophosphate($Mg(PF_6)_2$), hexafluoroarsenate ($Mg(AsF_6)_2$), perfluoroalkyl sulfonate($Mg(Rf1SO_3)_2$ where Rf1 is a perfluoroalkyl group, perfluoroalkylsulfonylimide salt ($Mg((Rf2SO_2)_2N)_2$ where Rf2 is a perfluoroalkyl group, trifluoroalkylsulfonylimide salt ($Mg((CF_3SO_2)_2N)_2$), and a combination thereof. The magnesium salt may also be any of conventional magnesium salts in the art.

A concentration of the magnesium salt contained in the electrolytic solution may be about 0.01 to about 2.0 M, for example, about 0.01 to about 1.5 M, for example, about 0.01 to about 1.0 M.

If the concentration of the magnesium salt is within the ranges described above, the degree of dissociation of the magnesium salt in the non-aqueous organic solvent is improved and conductivity of the magnesium ion is effectively improved.

Nonlimiting examples of the non-aqueous organic solvent are tetrahydrofurane (THF), 2-methylfuran, 4-methyldioxolane, 1,3-dioxolane, 1,4-dioxane, 1,2-dimethoxyethane, dimethoxymethane, ethylenecarbonate, propylencarbonate, γ-butyrolactone, methylformate, sulforane, 3-methyl-2-oxazolidinone, dimethylcarbonate, hexane, toluene, dimethylether, and a combination thereof. The non-aqueous organic solvent may also be any of conventional non-aqueous organic solvents used in the art.

A magnesium battery according to an embodiment of the present invention includes a positive electrode including a positive active material that intercalates or deintercalates a magnesium ion, a negative electrode including a negative active material that intercalates or deintercalates a magnesium ion, and an electrolytic solution which is interposed between the positive electrode and the negative electrode and with which the positive electrode and the negative electrode are impregnated.

The electrolytic solution of the magnesium battery includes an anion receptor that is non-covalently bonded to an anion of a magnesium salt, which has low reactivity with air, in order to dissociate the magnesium salt in an aqueous organic solvent. Due to the inclusion of the anion receptor, the degree of dissociation of a magnesium salt in the electrolytic solution is improved, and thus, the chemical stability and reversibility of the magnesium battery is improved.

The magnesium battery may include a positive electrode including a positive active material that intercalates or deintercalates a magnesium ion.

The positive active material may include at least one compound selected from the group consisting of an oxide compound, a halogen compound, a sulfide compound, a phosphate compound, a phosphide compound, and a diboride compound of a metal element.

The metal element may include at least one selected from the group consisting of scandium (Sc), titanium (Ti), vanadium (V), chromium (Cr), manganese (Mn), iron (Fe), cobalt (Co), molybdenum (Mo), lead (Pb), ruthenium (Ru), tungsten (W), zirconium (Zr), nickel (Ni), copper (Cu), and zinc (Zn). Nonlimiting examples of the positive active material are $CO_3O_4$, $Mn_2O_3$, $Mn_3O_4$, $MoO_3$, $PbO_2$, $Pb_3O_4$, $RuO_2$, $V_2O_5$, $WO_3$, $Mg_2MnSiO_4$, $TiS_2$, $VS_2$, $ZrS_2$, $Mo_3O_4$, $Mo_6S_8$, $MoB_2$, $TiB_2$, and $ZrB_2$. The metal element may be any one of commercially available compounds in the art.

The positive electrode may further include a binder and/or a conductive agent.

The binder may allow positive active material particles to be attached to each other and the positive active material to be attached to the current collector. Examples of the binder are polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinyllidene fluoride, polyethylene, polypropylene, styrene-butadiene rubber, acrylated styrene-butadiene rubber, an epoxy resin, nylon, and a combination thereof.

The conductive agent may provide conductivity to the positive electrode, and may be any one of various materials that do not cause any chemical change in the battery including the conductive agent and are electronically conductive. Examples of the conductive agent are natural graphite, artificial graphite, carbon black, acetylene black, ketjen black, carbon fiber, metal powder or fiber of copper, nickel, aluminum, or silver, a conductive agent such as a polyphenylene derivative, and a combination thereof.

The magnesium battery may include a negative electrode that includes a negative active material that intercalates or deintercalates a magnesium ion.

The negative active material may be at least one selected from the group consisting of a single material of magnesium and a magnesium-containing alloy.

In an embodiment, the negative active material may be a magnesium-containing alloy so as to improve various performance characteristics of the battery, excluding energy capacity, for example, to stabilize the negative electrode during charging and discharging. In another embodiment, the negative active material may be a plane-shape magnesium metal in order to increase energy capacity of the negative electrode.

The negative electrode may further include a binder and/or a conductive agent.

The binder may allow negative active material particles to be attached to each other and the negative active material to be attached to the current collector. Nonlimiting examples of the binder are polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinyllidene fluoride, polyethylene, polypropylene, styrene-butadiene rubber, acrylated styrene-butadiene rubber, an epoxy resin, nylon, and a combination thereof.

The conductive agent may provide conductivity to the negative electrode, and may be any one of various materials that do not cause any chemical change in a battery including the conductive agent and are electronically conductive. Examples of the conductive agent are natural graphite, artificial graphite, carbon black, acetylene black, ketjen black, carbon fiber, metal powder or fiber of copper, nickel, aluminum, or silver, a conductive agent such as a polyphenylene derivative, and a combination thereof. Examples of the current collector used in the negative electrode are copper foil, nickel foil, stainless steel foil, titanium foil, magnesium foil, nickel foam, copper foam, a polymer substrate coated with a conductive metal, and a combination thereof.

In order to prepare each of the positive electrode and the negative electrode, an active material, a binder, and a conductive agent are mixed in a solvent to prepare an active material composition and then a current collector is coated with the active material composition. A nonlimiting example of the solvent may be N-methylpyrrolidone.

According to a type of the magnesium battery, a separator for physically or electrically separating the positive electrode from the negative electrode may be further used. For example, a separator may be disposed between the positive electrode and the negative electrode, and the electrolytic solution may be present between the positive electrode and the separator and between the negative electrode and the separator. Examples of the separator are a single or multi-layer of polyethylene, polypropylene, or polyvinyllidene fluoride, and a mixed multi-layer, such as a two-layer separator including polyethylene and polypropylene, a three-layer separator including polyethylene, polypropylene, and polyethylene, or a three-layer separator including polypropylene, polyethylene, polypropylene.

The magnesium battery may be a primary battery or a secondary battery. For example, the magnesium battery may be a secondary battery. The magnesium battery may be a cylindrical battery, a rectangular battery, a coin-type battery, or a pouch-type battery. For example, the magnesium battery may be a coin-type battery. The magnesium battery may be a bulky battery or a film-type battery. Methods of manufacturing the batteries are obvious in the art and thus, will not be described herein.

One or more embodiments will now be described in further detail with reference to the following examples. These examples are for illustrative purposes only and are not intended to limit the scope of the one or more embodiments

EXAMPLE

Preparation of Anion Receptor

Preparation Example 1

Preparation of Anion Receptor 4.7 g of ethylamine hydrochloride salt was dissolved in 25 ml of ethanol, and 3.47 g of 39% formaldehyde aqueous solution was slowly added thereto at a temperature of 0° C. and then, the mixture was stirred for 15 minutes. Then, 4 ml of pyrrol was added thereto at the same temperature and after the temperature was increased to room temperature, the resultant mixture was stirred for 16 hours. Then, the mixture was decompressed to remove a solvent used and then washed with ethylether and dissolved in 30 ml of water. Then, $K_2CO_3$ aqueous solution (8 g/100 mL $H_2O$) was added to the mixture and extraction was performed thereon with $CH_2Cl_2$, and an organic layer was dried with anhydrous sodium sulfate and filtered. Then, a solvent was removed from the filtrate under reduced pressure and then, column chromatography was performed on the filtrate by using alumina. Then, the purified filtrate was recrystallized in a mixed solution including ethylether and petrolium ether to produce an ethyl tetra aza calixpyrrol represented by Formula 9 below.

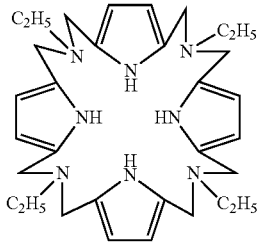

<Formula 9>

Preparation Example 2

Preparation of Anion Receptor 629 g (3.30 mol) of p-toluene sulfonyl chloride was mixed with 2000 mL of diethyl ether. The mixture was added to 750 ml of aqueous solution including 130.5 g (1.25 mol) of N,N'-bis(3-aminopropyl)ethylenediamine and 132 g (3.3 mol) of sodium hydroxide for 4 hours and then stirred at room temperature for 2 hours. The resultant product was filtered and washed with water, ethanol, and diethyl ether to prepare 463 g of 1,5,8,12-Tetrakis(p-tolylsulfonyl)-1,5,8,12-tetraazadodecane, which is in the form of white crystal.

Meanwhile, 200 g (6.037 mol) of p-toluene sulfonyl chloride and 3 L of pyridine were mixed in a 3-neck flask and the mixture was stirred at a temperature of 50° C. The flask was placed in a water bath at a temperature of 30° C., and 300 ml of pyridine solution in which 206 g of diethylenetriamine was dissolved was slowly added thereto while a temperature of about 60° C. was maintained. Then, the reaction solution was left at a temperature of about 60° C. for 30 minutes and then cooled and loaded into two 4 L triangle flasks. Then, 100 ml of water was slowly added to the respectively solution and stirred for 12 hours. Then, the mixture was cooled for 2 hours and a white solid was isolated therefrom. The white solid was washed with cold ethanol several times and then dried at a temperature of 100° C. under vacuum conditions, thereby producing about 1000 g of N,N',N"-tris(p-tolylsulfonyl)diethylenetriamine.

Also, 226 g (0.4 mol) of N,N',N"-tris(p-tolylsulfonyl)diethylenetriamine, 77.5 g (0.881 mol) of ethylene carbonate, and 0.7 g of KOH were mixed in a 3-neck flask, and the mixture was stirred at a temperature of about 170° C. for 4 hours. The reaction solution was cooled to 90° C. and then 500 ml of methanol was added thereto. The resultant solution was refluxed for 30 minutes and then treated with 5 g of active carbon and filtered with celite. Then, about 130 ml of water was added thereto to crystallize the filtrate. Then, the product was washed with a mixed solution including water and ethanol in a mixture ratio of 3:1 and dried at a temperature of 50° C. under vacuum conditions to produce 3,6,9-tris(p-tolylsulfonyl)-3,6,9-triazaundecane-1,11-diol.

200 g (0.306 mol) of the 3,6,9-tris(p-tolylsulfonyl)-3,6,9-triazaundecane-1,11-diol solution and 100 ml of triethylamine and 1500 ml of dichloromethane solution were stirred in a nitrogen atmosphere. The mixed solution was placed in an acetone-dry ice vessel, and while the temperature was maintained at about −18° C., 74 g (0.65 mol) of metane sulfonyl chloride was added thereto for 10 minutes. Then, the vessel was replaced with ice and then the solution was stirred for 30 minutes. Then, the solution was added to a mixed solution including 1 L of ice and 500 ml of 10% hydrochloric acid solution and then stirred. An organic layer separated from the solution was washed with 1 L of water and a saturated salt solution and then dried with anhydrous magnesium sulfate to produce a white solid. 250 ml of dichloromethane and 500 ml of ethylacetate were added to lower the temperature, thereby crystallizing the white solid. The crystallized solid was sufficiently dried under vacuum conditions to produce about 235 g of 3,6,9-Tris(p-tolylsulfonyl)-3,6,9-triazaundecane-1,11-dimethanesulfonate.

Subsequently, 126 g (0.16 mol) of 1,5,8,12-Tetrakis(p-tolylsulfonyl)-1,5,8,12-tetraazadodecane was dissolved in 1500 ml of anhydrous dimethylform amide and then, 7.2 g (0.3 mol) of NaH was slowly added thereto in a nitrogen atmosphere. The mixture was heated for 30 minutes at a temperature of 80° C. 500 ml of dimethylform amide solution in which 129.5 g (0.16 mol) of the 3,6,9-Tris(p-tolylsulfonyl)-3,6,9-triazaundecane-1,11-dimethanesulfonate was dissolved was slowly added to the mixture at a temperature of 80° C. and then left to sit for 30 minutes. The reaction solution was cooled to room temperature, and also, cooled using iced water, and a filtered precipitate was recrystallized with acetone to produce 1,5,8,12,15,18,21-Heptakis(p-tolylsulfonyl)-1,5,8,12,15,18,21-heptaazacyclotricosane.

63.3 g (0.045 mol) of the 1,5,8,12,15,18,21-Heptakis(p-tolylsulfonyl)-1,5,8,12,15,18,21-heptaazacyclotricosane was mixed with 300 ml of 98% sulfuric acid and 8 ml of water, and then the mixed solution was heated at a temperature of 90° C. for 3 days and then cooled. The mixed solution was added to 2000 ml of diethylether and then diethylether was subjected to decanting, and the residual was dissolved in 200 ml of water. A pH of the resultant solution was controlled to be pH 13 by using a NaOH aqueous solution, and the solution was filtered and extracted with ethanol. The ethanol used was evaporated from the extraction product and impurities were removed therefrom under vacuum conditions according to a kugelrohr distillation method to produce 8 g of 1,5,8,12,15,18,21-heptaazacyclotricosane.

Meanwhile, 5-tert-Butyl-2'-(trifluoromethoxy)biphenylyl-2-diazoniumhexafluoroantimonate was added to a Pyrex glass filled with ethanol and liquid nitrogen (about −100° C.), and the Pyrex glass was exposed to a high-pressure mercury lamp (400 W) for 70 minutes, and methylene chloride was added thereto and the temperature was slowly increased to −10° C. for 3 hours to produce trifluoromethyl oxonium salt.

8 g (0.024 mol) of 1,5,8,12,15,18,21-Heptaazacyclotricosane and 90.9 g (0.168 mol) of the trifluoromethyl oxonium salt were refluxed in an argon atmosphere for 3 hours to produce 9.7 g of 1,5,8,12,15,18,21-Heptakis(trifluoromethyl)-1,5,8,12,15,18,21-heptaazacyclotricosane represented by Formula 12 below.

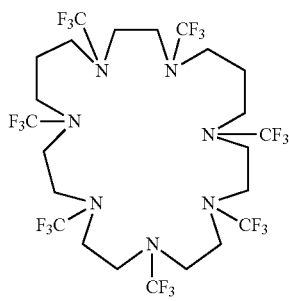

<Formula 12>

Preparation of Electrolytic Solution for Magnesium Battery and Magnesium Battery Example 1

Preparation of Electrolytic Solution for Magnesium Battery

An electrolytic solution for a magnesium battery was prepared by mixing 0.1M solution prepared by mixing 0.1M $Mg(ClO_4)_2$ with tetrahydrofuran (THF) and the anion receptor prepared according to Preparation Example 1.

Example 2

Manufacturing of Magnesium Battery 8 parts by weight of $Mo_3S_4$ as a positive active material, 1 part by weight of ketjen black (EC-600JD), and 1 part by weight of PVDF were mixed and the mixture was mixed with N-methyl-2-pyrrolidone (NMP) to prepare a slurry for forming a positive electrode. Then, a 10□-thick stainless steel foil was coated with the slurry and subjected to drying, and compression was performed with a pressing device to manufacture a positive electrode. A coin-type magnesium battery was manufactured by using the positive electrode, a magnesium foil as a negative electrode, a glass filter (Whatman, GF/F) separator, and the electrolytic solution prepared according to Example 1.

Comparative Example 1

Preparation of Magnesium Electrolytic Solution

An electrolytic solution for a magnesium battery was prepared in the same manner as in Example 1, except that the anion receptor was not used.

Comparative Example 2

Preparation of Magnesium Electrolytic Solution

An electrolytic solution for a magnesium battery was prepared in the same manner as in Example 1, except that acetonitrile was used instead of tetrahydrofuran (THF) and the anion receptor was not used.

Comparative Example 3

Manufacturing of Magnesium Battery

A coin-type magnesium battery was manufactured in the same manner as in Example 2, except that the electrolytic solution prepared according to Comparative Example 1 was used.

Comparative Example 4

Manufacturing of Magnesium Battery

A coin-type magnesium battery was manufactured in the same manner as in Example 2, except that the electrolytic solution prepared according to Comparative Example 2 was used.

Measurement Results of Impedance and Cyclic Voltammetry of Electrolytic Solution Evaluation Example 1

Impedance Measurement Results of Electrolytic Solution

Resistance of an electrolyte was measured by impedance spectroscopy, and a frequency response analyzer (1260) and an electrochemical interface (1287), which are manufactured by Solartron Analytical Company, were used as an spectrometer. A measurement frequency region was in a range of 1 Hz to 1 MHz. A stainless steel disk electrode was used as a resistance measurement electrode, and impedance was measured by using a coin-type magnesium battery.

Impedance of the electrolytic solutions prepared according to Example 1 and Comparative Example 1 were measured, and the results are shown in FIG. 1.

Referring to FIG. 1, the impedance of the electrolytic solution of Example 1 was about 1/20, and thus it was confirmed that the impedance of the electrolytic solution of Example 1 is much lower than that of Comparative Example 1.

Such a decrease in impedance may be attributed to an increase in a degree of dissociation of $Mg(ClO_4)_2$ salt caused by bonding a $ClO_4^-$ anion to ethyl tetra aza calix pyrrol represented by Formula 9 in the electrolytic solution of Example 1.

Evaluation Example 2

Cyclic Voltammetry Measurement Results

A cyclic voltammetry (CV) of a magnesium battery was measured by using an electrochemical interface (1287), which is manufactured by Solartron Analytical. Au was used as a working electrode and magnesium metal was used as a center electrode, and the working electrode was disposed to face the center electrode while a glass filter was interposed therebetween. Also, a reference electrode was fixed in such a position that the reference electrode did not contact both the working electrode and the center electrode. The working electrode, the center electrode, and the reference electrode were immersed in each of the electrolytic solutions prepared according to Example 1 and Comparative Examples 1 and 2 to manufacture a beaker-type battery, and oxidation and reduction characteristics of an electrolytic solution at a scan rate of 1 mV/sec were evaluated. The results are shown in FIG. 2.

Figure 2:
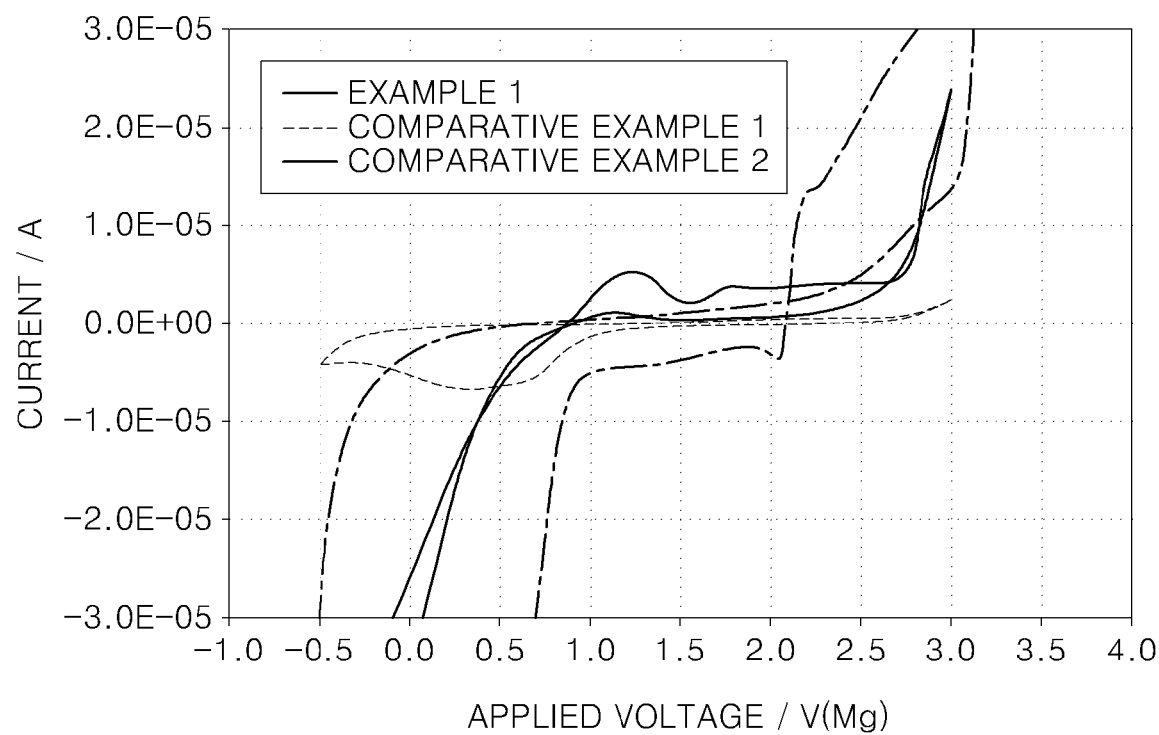
FIG. 2 shows cyclic voltammetry measurements of electrolytic solutions manufactured according to Example 1 and Comparative Examples 1 and 2.

Referring to FIG. 2, regarding the electrolytic solution of Example 1, when an applied potential is decreased in a negative potential direction, a reduction current peak appears, and when an applied potential is applied in a positive potential direction, an oxidation current peak appears in a range of about 1 to about 1.5 V. Also, regarding the electrolytic solution of Comparative Example 1, both the oxidation current peak and the reduction current peak do not appear, and regarding the electrolytic solution of Comparative Example 2, the reduction current peak appears and the oxidation current peak does not appear.

Regarding the electrolytic solution of Example 1, the reduction current peak and the oxidation current peak appear due to electro-deposition and dissolution of magnesium (Mg), and this result may be due to dissociation of $Mg(ClO_4)_2$ salt caused by addition of an anion receptor. That is, it is assumed that due to the addition of the anion receptor, which is a macrocyclic molecule, an amount of $Mg^{2+}$ ion dissociated from the $Mg(ClO_4)_2$ salt was increased, and the $Mg^{2+}$ ion was reversibly engaged in an oxidation and reduction reaction.

As described above, an electrolytic solution according to the one or more of the above embodiments of the present invention includes an anion receptor, and in the electrolytic solution, the anion receptor forms a complex together with an anion of a magnesium salt, thereby increasing a degree of dissociation of the magnesium ion. Also, a magnesium battery including the electrolytic solution is chemically stable and has high reversibility.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electrolytic solution comprising:
   a magnesium salt;
   a non-aqueous organic solvent; and
   an anion receptor,
   wherein the anion receptor comprises at least one compound compounds represented by Formulae 1, or Formulae 1 and in combination with Formulae 2 below:

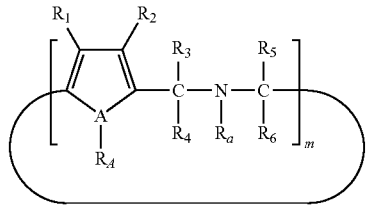
<Formula 1>

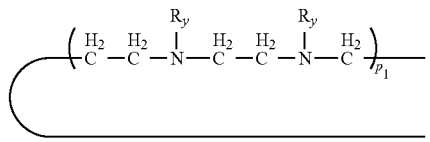
<Formula 2>

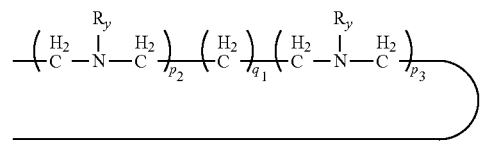

where

A is an oxygen (O) atom, a nitrogen (N) atom, or a sulfur (S) atom;

m is an integer of 3 to 8;

$p_1$, $p_2$, and $p_3$ are each independently an integer of 0 to 10 and $p_1+p_2+p_3>0$;

$q_1$ is an integer of 0 to 5;

$R_A$ and $R_a$ are each independently a hydrogen atom, a halogen atom, an amino group, —N(R)(R') where R and R' are each independently a hydrogen atom, a C1-C10 alkyl group, or a C6-C20 aryl group, a carboxy group, a carbamate group, a substituted or unsubstituted C1-C20 alkyl group, or a substituted or unsubstituted C6-C20 aryl group;

$R_1$ through $R_6$ are each independently a hydrogen atom, a halogen atom, a hydroxy group, —N(R)(R') where R and R' are each independently a hydrogen atom, a C1-C10 alkyl group, or a C6-C20 aryl group, an ester group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group; and $R_y$ is $CF_3$, a carbonyl group, or an ester group.

2. The electrolytic solution of claim 1, wherein the anion receptor comprises a compound represented by Formula 3 below:

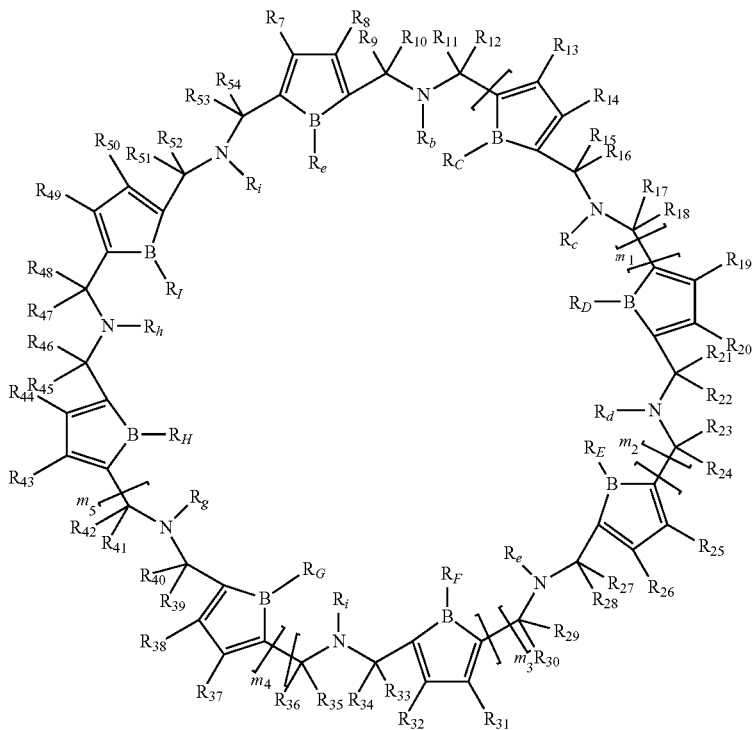

<Formula 3> where

B is an oxygen (O) atom, a nitrogen (N) atom, or a sulfur (S) atom;

$m_1$ through $m_5$ are each 0 or 1;

$R_B$, $R_C$, $R_D$, $R_E$, $R_F$, $R_G$, $R_H$, $R_I$, $R_b$, $R_c$, $R_d$, $R_e$, $R_f$, $R_g$, $R_h$, and $R_i$ are each independently a hydrogen atom, a halogen atom, an amino group, —N(R)(R') where R and R' are each independently a hydrogen atom, a C1-C10 alkyl group, or a C6-C20 aryl group, a carboxy group, a carbamate group, a substituted or unsubstituted C1-C20 alkyl group, or a substituted or unsubstituted C6-C20 aryl group; and $R_7$ through $R_{54}$ are each independently a hydrogen atom, a hydroxy group, —N(R)(R') where R and R' are each independently a hydrogen atom, a C1-C10 alkyl group, or a C6-C20 aryl group, an ester group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

3. The electrolytic solution of claim 1, wherein the anion receptor comprises a compound represented by Formula 4:

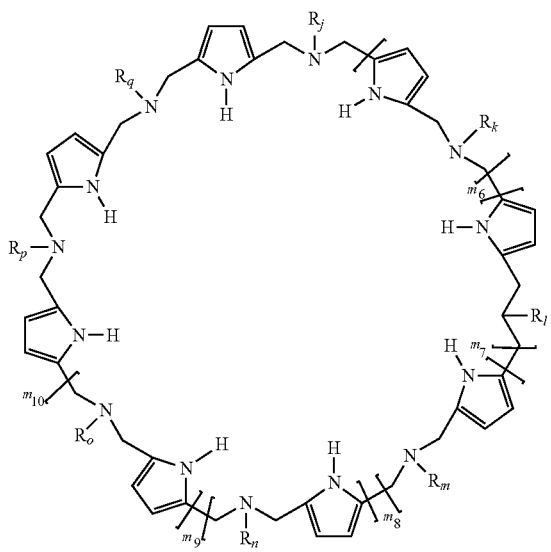

<Formula 4> where $m_6$ through $m_{10}$ are each 0 or 1; and $R_j$, $R_k$, $R_l$, $R_m$, $R_o$, $R_p$ and $R_q$ are each independently a hydrogen atom, a hydroxy group, —N(R)(R') where R and R' are each independently a hydrogen atom, a C1-C10 alkyl group, or a C6-C20 aryl group, an ester group, an amide group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

4. The electrolytic solution of claim 1, wherein the anion receptor comprises at least one compound selected from the group consisting of compounds represented by Formulae 5 and 6 below:

<Formula 5>

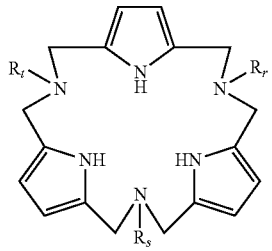

<Formula 6>

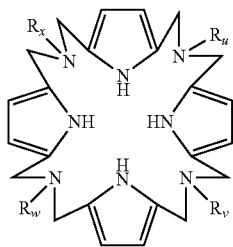

where $R_r$, $R_s$, $R_t$, $R_u$, $R_v$, $R_w$ and $R_x$ are each independently a hydrogen atom, a hydroxy group, —N(R)(R') where R and R' are each independently a hydrogen atom, a C1-C10 alkyl group, or a C6-C20 aryl group, an ester group, an amide group, a carbonate group, a carboxy group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cyclo alkyl group, a substituted or unsubstituted C6-C30 aryl group, a substituted or unsubstituted C6-C30 aryloxy group, or a substituted or unsubstituted C6-C30 heteroaryl group.

5. The electrolytic solution of claim 1, wherein the anion receptor comprises at least one compound selected from the group consisting of compounds represented by Formulae 7 through 9 below:

<Formula 7>

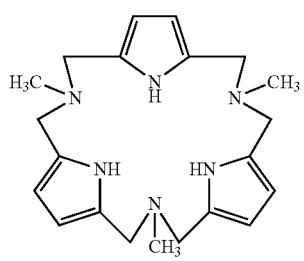

<Formula 8>

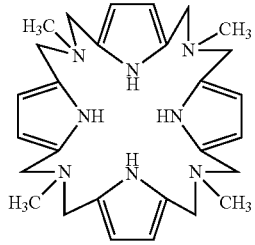

<Formula 9>

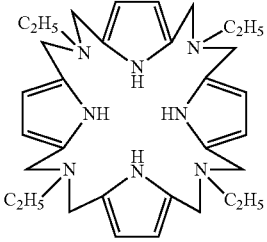

6. The electrolytic solution of claim 1, wherein a concentration of the anion receptor contained in the electrolytic solution is about 0.01 to about 2.0M.

7. The electrolytic solution of claim 1, wherein the magnesium salt comprises at least one selected from the group consisting of a chloride ($MgCl_2$), a bromide ($MgBr_2$), a iodide ($MgI_2$), perchlorate salt ($Mg(ClO_4)_2$), tetrafluoroborate($Mg(BF_4)_2$), tetraphenylborate($Mg(B(C_6H_5)_4)_2$), butyltriphenylborate($Mg(BC_4H_9(C_6H_5)_3)_2$), dibutyldiphenylborate($Mg(B(C_4H_9)_2(C_6H_5)_2)_2$), tributylphenylborate($Mg(B(C_4H_9)_3(C_6H_5))_2$), tetrabutylborate($Mg(B(C_4H_9)_4)_2$), hexafluorophosphate($Mg(PF_6)_2$), hexafluoroarsenate ($Mg(AsF_6)_2$, perfluoroalkyl sulfonate($Mg(Rf1SO_3)_2$ where Rf1 is a perfluoroalkyl group, perfluoroalkylsulfonylimide salt ($Mg((Rf2SO_2)_2N)_2$ where Rf2 is a perfluoroalkyl group, and trifluoroalkylsulfonylimide salt ($Mg((CF_3SO_2)_2N)_2$).

8. The electrolytic solution of claim 1, wherein a concentration of the magnesium salt contained in the electrolytic solution is about 0.01 to about 2.0M.

9. The electrolytic solution of claim 1, wherein the non-aqueous organic solvent comprises at least one selected from the group consisting of tetrahydrofurane (THF), 2-methylfuran, 4-methyldioxolane, 1,3-dioxolane, 1,4-dioxane, 1,2-dimethoxyethane, dimethoxymethane, ethylenecarbonate, propylencarbonate, γ-butyrolactone, methylformate, sulforane, 3-methyl-2-oxazolidinone, dimethylcarbonate, hexane, toluene, and dimethylether.

10. A magnesium battery comprising:
a positive electrode comprising a positive active material that intercalates or deintercalates a magnesium ion,
a negative electrode comprising a negative active material that intercalates or deintercalates a magnesium ion, and
an electrolytic solution which is interposed between the positive electrode and the negative electrode and with which the positive electrode and the negative electrode are impregnated,
wherein the electrolytic solution is the electrolytic solution of claim 1.

11. The magnesium battery of claim 10, wherein the electrolytic solution is the electrolytic solution of claim 2.

12. The magnesium battery of claim 10, wherein the electrolytic solution is the electrolytic solution of claim 3.

13. The magnesium battery of claim 10, wherein the positive active material comprises at least one compound selected from the group consisting of an oxide compound, a halogen compound, a sulfide compound, a phosphate compound, a phosphide compound, and a diboride compound of a metal element.

14. The magnesium battery of claim 13, wherein the metal element comprises at least one selected from the group consisting of scandium (Sc), Titanium (Ti), vanadium (V), chromium (Cr), manganese (Mn), iron (Fe), cobalt (Co), molybdenum (Mo), lead (Pb), ruthenium (Ru), tungsten (W), zirconium (Zr), nickel (Ni), copper (Cu), and zinc (Zn).

15. The magnesium battery of claim 10, wherein the positive active material comprises at least one selected from the group consisting of $Co_3O_4$, $Mn_2O_3$, $Mn_3O_4$, $MoO_3$, $PbO_2$, $Pb_3O_4$, $RuO_2$, $V_2O_5$, $WO_3$, $Mg_2MnSiO_4$, $TiS_2$, $VS_2$, $ZrS_2$, $Mo_3O_4$, $Mo_6S_8$, $MoB_2$, $TiB_2$, and $ZrB_2$.

16. The magnesium battery of claim 10, wherein the negative active material comprises at least one selected from the group consisting of a single material of magnesium and a magnesium-containing alloy.

17. The magnesium battery of claim 10, wherein a separator is additionally disposed between the positive electrode and the negative electrode.

* * * * *